UNITED STATES PATENT OFFICE.

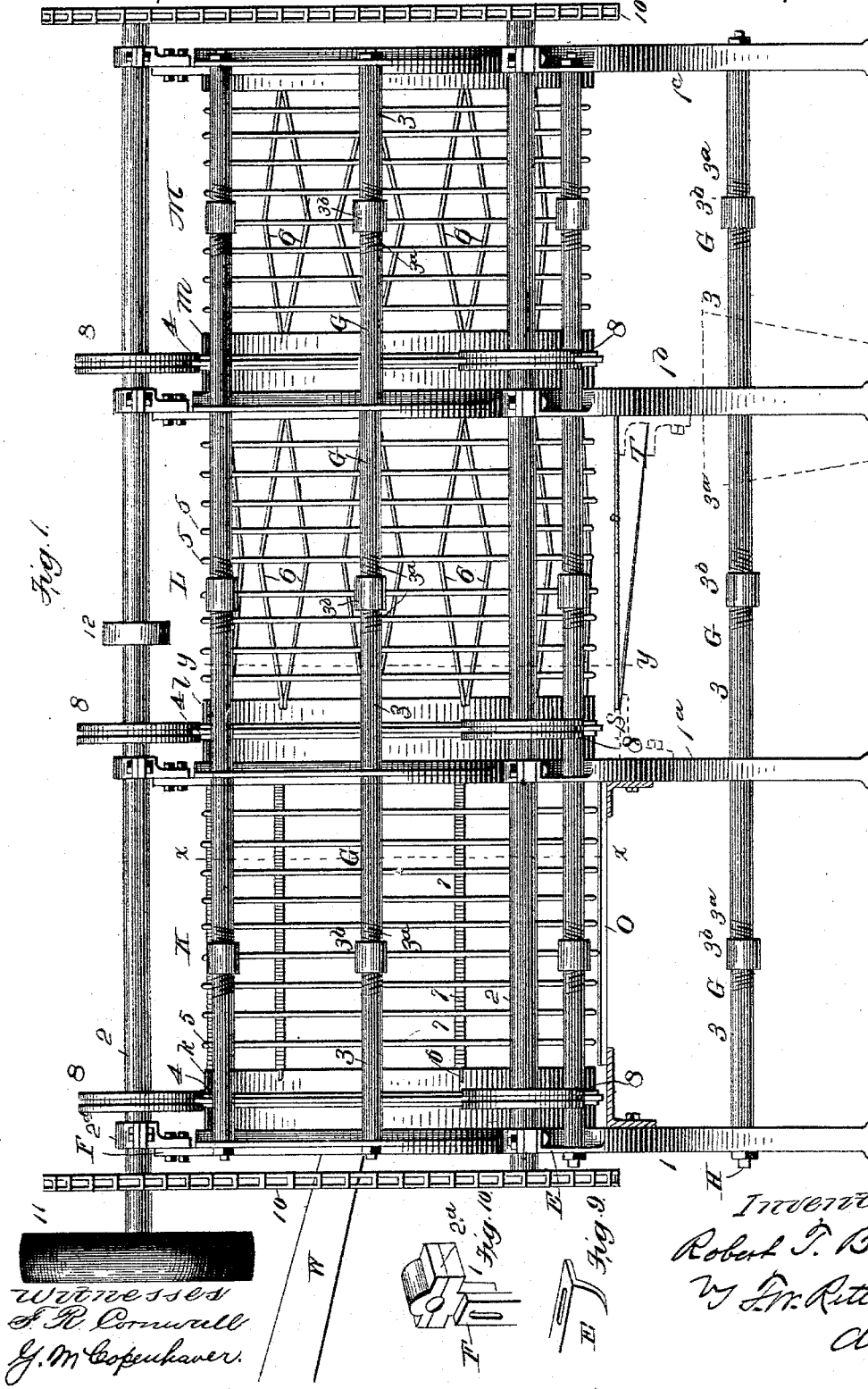

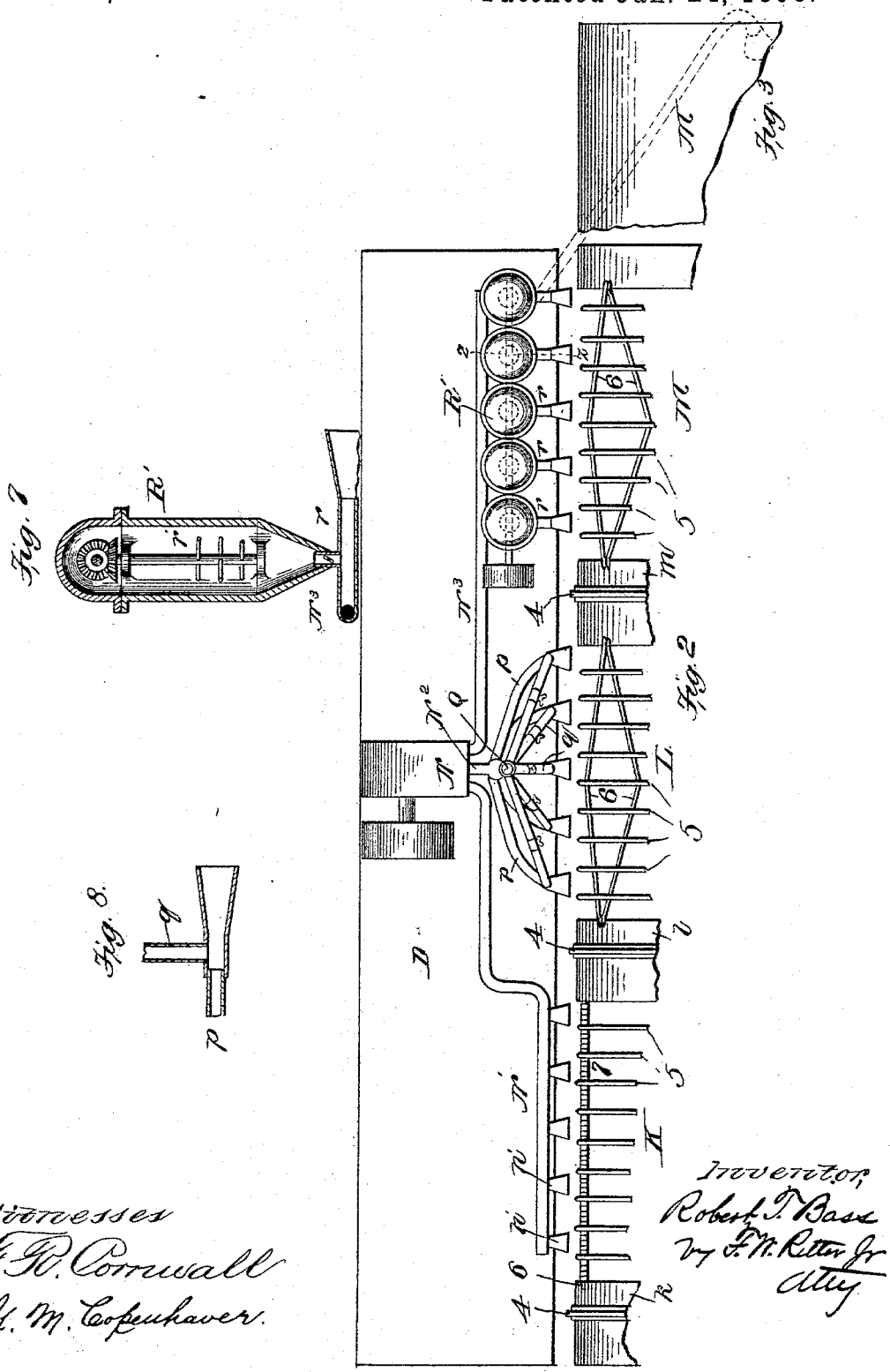

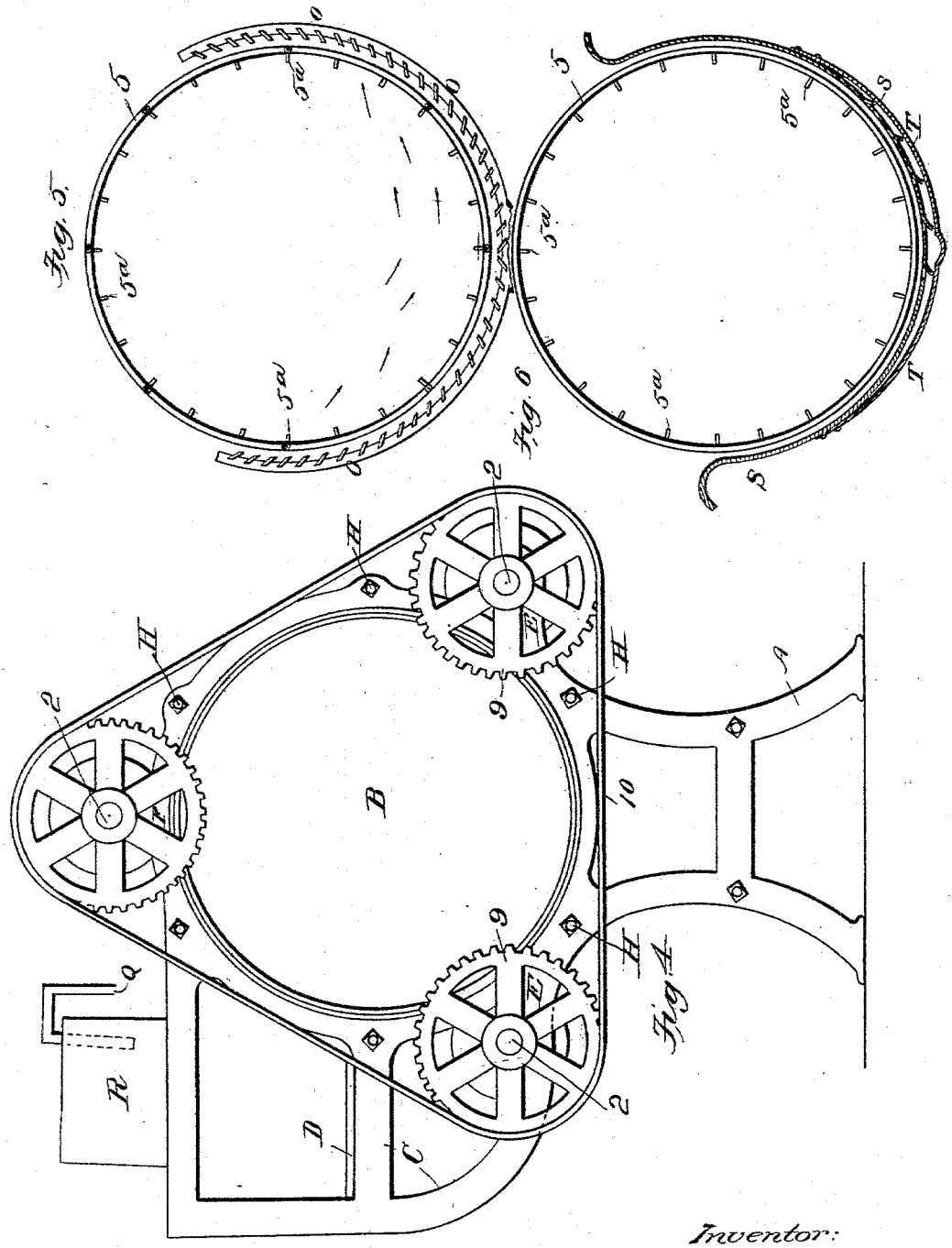
(No Model.) 3 Sheets—Sheet 3.
R. T. BASS.
TOBACCO CASING AND SPRAYING MACHINE.
No. 490,262. Patented Jan. 24, 1893.

ROBERT THOMAS BASS, OF DANVILLE, VIRGINIA.

TOBACCO CASING AND SPRAYING MACHINE.

SPECIFICATION forming part of Letters Patent No. 490,262, dated January 24, 1893.

Application filed February 19, 1892. Serial No. 422,101. (No model.)

*To all whom it may concern:*

Be it known that I, ROBERT THOMAS BASS, a citizen of the United States, residing at Danville, in the county of Pittsylvania and State of Virginia, have invented certain new and useful Improvements in Tobacco Casing and Spraying Machines; and I hereby declare the following to be a full, clear, and exact description of the same, reference being had to the accompanying drawings, wherein—

Figure 1 is a side elevation of a machine embodying my invention, the devices for applying the cleaning blast, the spray and the flavoring powder, and which are located in the opposite side of the open ring cylinder or cage, being omitted for sake of clearness. Fig. 2 is a plan view of a longitudinal section of the open ring cylinder or cage, and of the clearing blast—the spraying and the powder distributers, intended to show the relation of the latter devices to the cylinder or cage. Fig. 3 is a partial detail view of a modification of the last section or discharge end of the cylinder showing the means for applying the flavoring powder when a tight or barrel section is used instead of an open ring section. Fig. 4 is an end view showing the frame of the machine and part of the gearing for rotating the cylinder or cage. Fig. 5 is a vertical transverse section of the cylinder and the slotted deflector on the line $x$—$x$ Fig. 1, or through the first or receiving section of the cylinder or cage. Fig. 6 is a vertical transverse section of the cylinder and its apron on the line $y$—$y$ Fig. 1—or through that section of the cylinder where the spray is applied. Fig. 7 is an enlarged vertical section of one of the powder distributers, on the line $z$—$z$ Fig. 2. Fig. 8 is an enlarged sectional view of one of the spray distributers. Figs. 9 and 10 are enlarged detail views of the adjustable bearings of the gear and friction wheel shafts.

Like symbols refer to like parts wherever they occur.

My invention relates to the construction of that class of machines commonly termed "casing and spraying machines," which are employed for cleaning, moistening, and flavoring tobacco, as a preliminary to its conversion into the several trade products.

It has for its objects to simplify the construction and increase the efficiency of such machines, economize the labor, and cost of treatment of the tobacco; and to preserve the tobacco from injury and waste while undergoing the cleaning, spraying and flavoring treatment.

To this end, the main feature of my invention embraces a cage or cylinder having one or more open ring sections, in combination with mechanism for rotating the cage or cylinder, and with suitable blast or spray devices, either or both, accordingly as it may be desired to clean only or clean and moisten or flavor the tobacco at a single operation.

Subordinate features of the invention, embrace first,—the combination with the cylinder and suitable blast apparatus of interposed slotted deflectors for directing the cleaning currents into and out of the cylinder or cage; and second, the combination with the open ring cylinder or cage, of an apron for receiving and recovering the liquids, not taken up by the tobacco under treatment.

There are other minor features of invention embracing certain details of construction, and specific combinations all as will hereinafter more fully appear.

I will now proceed to describe my invention more fully so that others skilled in the art to which it appertains may apply the same.

In the drawings 1 indicates the frame for the support of the rotating cage or cylinder for carrying the tobacco under treatment. This frame may be composed of any desired number of sections $1^a$ $1^b$ $1^c$ &c. according to the length of the cylinder, each section of the general form shown in Figs. 1 and 4 that is to say with legs or standards A, having central openings B for the cylinder, side brackets C for the support of a suitable shelf D (see Fig. 2) and seats E. E. and F for the bearings of the shafts 2 which rotate the cage or cylinder.

Upon the bearing seats E, E, and F are adjustably secured the shaft bearings $2^a$, preferably in the manner illustrated in Figs. 9 and 10—that is to say the seats E E of the side shafts are slotted horizontally as indicated in Fig. 9, and the upper seat F is slotted vertically as indicated in Fig. 10—so that the several boxes or bearings 2ª may be moved to or from the axis of rotation of the cage or cylinder to center the cylinder in the frame and to take up any wear or slack between the track and the grooved rollers on the shafts 2. Instead of the adjustment shown any known equivalent adjustment for the journal bearings 2ª may be adopted.

Between the several sections 1, 1ª 1ᵇ &c. of the frame are interposed the distance braces G G each of which may be composed of two sections of pipe 3, and 3ª having right and left hand threads and connected by a similarly threaded ferrule 3ᵇ which forms a turn-buckle whereby the said distance braces B may be lengthened or shortened as circumstances require or to take up slack—and said tubular distance braces G, G, also serve as sheaths for the through rods H, by which the frame is held together.

The cage or cylinder which carries the tobacco under treatment is composed of several sections, K, L, M, two of which K and L are preferably composed of rings, and the last, M, may be either of rings or close as preferred. In constructing said cage or cylinder, I employ a series of broad rings $k$, $l$, $m$, which mark the division between the sections, and also serve as foundations or supports for the tracks 4, 4, which are attached thereto or formed thereon—and for the sake of brevity said rings $k$, $l$, $m$, may be termed the "track rings." The number of said rings employed will depend on the length of the cylinder required, and the number of its sections. In conjunction with said track rings, I use a series of narrow rings or hoops, 5, 5, 5, (see Fig. 1) which may be pierced for the passage of the connecting rods or wires 6, 6, and separated by interposed distance liners or washers 7, 7. The ends of the rods or wires 6, 6, being connected with the track rings $k$, $l$, $m$, sufficient hoops or rings 5, 5, 5, and liners 7, 7, 7, being used to obtain the desired length of section and opening between the rings. If desired two diverging and converging wires 6, 6, may be used as shown in sections L, and M, Fig. 1, in which case the rings 5 will be pierced to correspond with the divergence of the wires and the distance required between the rings 5, 5, or the wires will be otherwise secured to the rings 5, 5, and such arrangement will not only serve to brace and strengthen the cylinder, but will also permit the liners or washers 7, 7, to be dispensed with. Projecting inward from said rings 5, 5, 5, &c., are prods or points 5ª, 5ª, which may be three-quarters of an inch in length to catch the tobacco, carry it up and allow it to fall as the cylinder or cage revolves on its axis. I prefer to form the entire cage of open ring sections, but if desired, the last section M may be closed as indicated in Fig. 3.

Upon each of the shafts 2, hereinbefore referred to, are secured a series of grooved wheels 8, 8, 8, adapted to receive the tracks 4, 4, of the track rings $k$, $l$, $m$. The extremities of said shafts are provided with sprocket wheels 9, 9, and connected by chain belts 10, 10, or other suitable gearing is employed to cause the shafts 2, 2, and their rollers 2ª 2ª to revolve in unison and thus impart a uniform, steady axial rotation to the cage or cylinder composed of said sections K, L, M.

11 indicates a band wheel by which one of the shafts 2 may be driven; and 12 a pulley by which power may be communicated to a blast fan or other suitable air pump.

Supported on the shelf D and driven as before specified, or in other suitable manner, is a blast fan N, and leading therefrom are three primary air pipes N', N², N³, the first of which extends along section K of the cage or cylinder, and is then divided up into a series of fan shaped educts $n'$ $n'$ $n'$ to deliver a forcible current or blast of air into and through the tobacco for the purpose of freeing the tobacco from dust dirt, and foreign matter. At this point, there is interposed between the air jets $n'$ $n'$ $n'$, and the revolving cage or cylinder, and suitably supported on the frame 1, 1ª, a series of longitudinally and tangentially arranged slatted deflectors, $o$ $o$ $o$, (see Fig. 5) which encompass more than half the cylinders, so that the blast from the air jets $n'$ $n'$ $n'$ are deflected and caused to dip down and search the tobacco in the cylinder before they rise and escape at the opposite side of the cylinder, as indicated by the arrows in Fig. 5.

The primary air pipe N² is broken up into a series of distributing pipes $p$, $p$, $p$, having fan-shaped educts arranged along the section L of the cage or cylinder; and into said branches $p$, $p$, $p$, deliver fluid pipes $q$, $q$, $q$, which are connected by a common pipe Q with an elevated reservoir R (see Fig. 4) which may contain water-licorice-water, molasses water glycerine, or any fluid with which it may be desirable to moisten the tobacco. At this point there is arranged beneath the cylinder and partly surrounding the same an apron S (see Figs. 1 and 6) properly supported from the frame, to catch any surplus fluid which may drip from the tobacco under treatment, and said apron is slotted as at $s$ $s$ to deliver said fluid to an inclined attached trough T whence it flows to a suitable receptacle and is thus recovered for subsequent use.

The primary air pipe N³ extends along side the cage or cylinder section M and is broken up into a series of branches $r$ having fan shaped educts opposite said section, and connected with and delivering into each of said branches $r$ is a powder receptacle R' which will be provided with an agitator $r'$ which may be operated in any suitable or well known manner to prevent the caking of the powder in the receptacle and cause it to feed down into the blast pipe $r$ whence it is blown into the cylinder and on the tobacco under treatment. In case this last section M of the cylinder is imperforate, as before specified, a single pipe of larger dimensions and fan shaped educt will be carried around and into the delivery end of the cage as indicated in dotted lines Fig. 3.

The various pipes leading to the fluid reservoirs and powder receptacles will be supplied with suitable valves to control the quantity of powder or fluid delivered to the blast pipes, or to entirely shut off the same as may be desired.

At the receiving end of the machine is a suitable chute W for feeding the tobacco to the machine.

The tobacco casing and spraying machine hereinbefore described, may be used with the cage or cylinder in a horizontal position, or if preferred with the cage or cylinder in an inclined position by wedging up the frame at one end until the desired inclination of the cylinder is obtained; and will operate substantially as follows:—The cylinder or cage being revolved on its axis by suitable power, and the tobacco being fed into the receiving end thereof through the chute W, will be acted on in the ring section K by the air blast which having a direction first downward and then upward across the line of travel will lift and separate the tobacco traversing it and carrying off all dust as well as lightening up the leaves which pass thence into section L where they are subjected to the spray of liquid borne on the air blast from pipes $p$ and projected through the open rings of the cage. In this section L the moistening will be thoroughly effected, and the surplus fluid or that not taken up by the tobacco under treatment will drip into apron S and thence into trough T whence it will pass to a suitable receptacle for future use. From the section L the moistened tobacco passes into section M where it meets the air blast from pipes $r$ freighted if desired with suitable flavoring powder which is disseminated among and deposited on the leaves. The air blast in this section M also serves to reduce the moisture of the leaves so that they pass from the machine in the desired condition for the future steps of manufacture. In the several sections of the cage and during its passage through the machine, the tobacco has been repeatedly lifted and carried by the points or prods $5^a$ $5^a$ and allowed to fall into and through the blast so that all parts of the leaf are equally subjected to treatment and a uniform product is obtained, there being no chance for the tobacco to bunch and drift through the machine or to escape therefrom, without being thoroughly subjected to the several steps of the process.

Having thus described my invention what I claim and desire to secure by Letters Patent is

1. In a tobacco casing and spraying machine, the combination with a cage or cylinder composed of spaced rings, and means for rotating the same axially, of a blast pipe having fan-shaped educts arranged with their long axes parallel with the axis of the cage, and adjacent to said cage: substantially as and for the purposes specified.

2. A cage or cylinder for tobacco casing and spraying machines, composed of a series of spaced rings connected by diverging rods which brace the cage or cylinder; substantially as and for the purposes specified.

3. A cage or cylinder for tobacco casing and spraying machines, composed of two or more sections of spaced rings, and intermediate track rings; substantially as and for the purposes specified.

4. The combination in a tobacco casing and spraying machine, of a cage or cylinder composed of two or more sections of spaced rings and intermediate track rings, in combination with a suitable frame, and a series of shafts provided with grooved rollers for the reception of the track rings; substantially as and for the purposes specified.

5. In a tobacco casing and spraying machine, the combination with a cylinder or cage composed of spaced rings, and means for rotating the same axially, of a blast pipe having fan-shaped educts arranged with their long axes parallel with the axis of the cage, and adjacent to said cage; a reservoir; and pipes leading from the reservoir and delivering into the blast pipes: substantially as and for the purposes specified.

6. The combination in a tobacco casing and spraying machine, of a cage or cylinder composed of a series of spaced rings, a slatted deflector partially inclosing the same, and a suitable air blast device; substantially as and for the purposes specified.

7. The combination in a tobacco casing and spraying machine, of a cage or cylinder composed of spaced rings, an apron partially inclosing the same, and suitable means for delivering a spray into and through the spaced ring section of the cage or cylinder; substantially as and for the purposes specified.

8. The combination in a tobacco casing and spraying machine, of a suitable cage or cylinder, a frame therefor composed of sections, adjustable distance braces between the sections, and tie rods; substantially as and for the purposes specified.

9. The combination in a tobacco casing and spraying machine, of a suitable cage or cylinder, a frame therefor composed of sections, a series of tie rods, and a series of adjustable tubular distance braces which serve as sheaths for the tie-rods; substantially as and for the purposes specified.

10. The combination in a tobacco casing and spraying machine, of a cage or cylinder composed of two or more sections of spaced rings and intermediate track rings, a suitable frame having adjustable distance braces, a series of shafts having rollers adapted to the track rings, and adjustable bearings for said shafts; substantially as and for the purposes specified.

11. A cage or cylinder for tobacco casing and spraying machine, composed of a series of spaced rings provided on the interior with prods or points; substantially as and for the purposes specified.

In testimony whereof I affix my signature, in presence of two witnesses, this 17th day of February, 1892.

ROBERT THOMAS BASS.

Witnesses:
E. W. GRIGG,
GEO. B. JENNINGS.